United States Patent [19]
Stan

[11] Patent Number: 5,341,687
[45] Date of Patent: Aug. 30, 1994

[54] 3-DIMENSIONAL PRESSURE SENSOR

[75] Inventor: Aurel V. Stan, Canton, Ohio

[73] Assignee: The Goodyear Tire & Rubber Company, Akron, Ohio

[21] Appl. No.: 976,856

[22] Filed: Nov. 16, 1992

[51] Int. Cl.$^5$ .............................................. G01L 3/00
[52] U.S. Cl. ............................ 73/862.046; 73/146; 73/DIG. 4
[58] Field of Search ............ 73/862.68, DIG. 4, 146, 73/862.041–862.043, 862.046

[56] References Cited

U.S. PATENT DOCUMENTS

| | | | |
|---|---|---|---|
| 4,555,953 | 12/1985 | Dario et al. | 73/862.046 |
| 4,802,371 | 12/1989 | Calderara et al. | 73/DIG. 4 |
| 4,875,378 | 10/1989 | Yamazaki et al. | 73/862.046 |
| 4,964,302 | 10/1990 | Grahn et al. | 72/862.046 |
| 5,054,323 | 10/1991 | Hubbard, Jr. et al. | 73/DIG. 4 |
| 5,209,126 | 5/1993 | Grahn | 73/862.046 |

OTHER PUBLICATIONS

Sensors, Jun. 1992, "Ultrasonic Force Sensor Technology".
"Making a PVDF Film".
Bonneville Scientific, Oct. 1992, "Principle of Operation and Specifications" for Model 200-16X16A Tactile Sensor System.

Primary Examiner—Richard E. Chilcot, Jr.
Assistant Examiner—Elizabeth L. Dougherty
Attorney, Agent, or Firm—David E. Wheeler

[57] ABSTRACT

Use of ultrasonic stimulation together with a pressure sensitive piezoelectric material in a sensor makes it possible to obtain three dimensional pressure measurements on an object in one operation. A piezoelectric material which is manufactured with a conductive surface on both sides, and shear orientation (i.e. piezo voltage produced by pressure on the material is sensitized in a single axis of the shear plane), and generates a proportional voltage when stretched or compressed (and tension and compression is sensed by the generation of opposite polarity voltages), makes it possible to measure normal forces by ultrasonic stimulation, and shear forces by the generation of piezo voltages, using the same sensor. In a preferred embodiment, multiple sensors are disposed in a high density array, and the various axes for the three dimensional measurements are obtained by varying the orientation of each sensor relative to an adjacent sensor. In an alternative embodiment, at least two differently oriented layers of film are included in each sensor.

9 Claims, 4 Drawing Sheets

3-DIMENSIONAL PRESSURE SENSOR

BACKGROUND OF THE INVENTION

This invention relates to a method and apparatus for obtaining measurements of normal pressure and shear pressure developed by an object; using a single sensor. In a preferred embodiment, an array of sensors are used to measure three dimensional pressures in one operation. The invention can be used to acquire a high resolution array of three dimensional tire footprint pressures.

Some tactile sensing systems have attempted to directly exploit the piezoelectric effect of PVDF film to measure force. The dynamic nature of that effect, however, does not permit static force measurements. Bonneville Scientific uses the PVDF film as a transmitter and receiver of ultrasonic pulses, allowing continuous measurement of a steady force.

Tactile sensors, as illustrated by Bonneville Scientific, use a 2-D array of ultrasound transmitters and receivers to measure the thickness of an overlying elastomer pad that is compressed when it is contacted by an object. The amount of the compression depends on the magnitude of the force applied by the object and the stiffness of the elastomer. The thickness measurement principle is analogous to ultrasonic pulse-echo ranging used in medical imaging and to SONAR for marine navigation and ranging.

Each element of the sensor array transmits an ultrasonic pulse that travels through the elastomer pad, is reflected off the top surface of the pad, and returns to the element. The time interval for this travel, or time-of-flight (TOF), is measured for each element. When a contacted object applies a force normal to the elastomer pad, the pad is compressed and the time-of-flight is reduced. The difference in time-of-flight is proportional to the compression of the pad, which, in turn, is proportional to the applied force. This relationship can be stated as:

$$d_1 - d_2 = \tfrac{1}{2} c(t_1 - t_2) \tag{1}$$

$$F = k(d_1 - d_2) = \tfrac{1}{2} kc(t_1 - t2) \tag{2}$$

where:
d=thickness of the pad over the element
t=time-of-flight
F=compressing force
c=speed of sound in the elastomer
k=elastomer stiffness.

A laminated sensor produced by Bonneville Scientific is rugged, has no moving parts, and is able to withstand loads of up to 2500 psi. It is highly accurate and gives repeatable results because time-of-flight rather than amplitude is measured, and drift in element or amplifier sensitivity is unimportant. Force measurements can be made every 4–6 $\mu$s.

The sensitivity or force range of the sensor can be altered by changing pads. A wide variety of elastomers can be used in the pads, and pads can be replaced inexpensively when they become worn, damaged, or contaminated.

The Bonneville device consists of the sensor array, an electronics module, a computer interface board, and a remote microcomputer. The sensor array, which lies on a 0.04 inch thick substrate, is a PVDF film with 256 elements measuring 0.060 inch by 0.060 inch each. The elements are arranged in 16 columns by 16 rows, with 0.010 inch separation between elements in each direction.

The elastomer pad in the Bonneville device consists of a urethane sheet that determines the sensor's force characteristics and an overlaying thin foam layer that provides a controlled interface for reflecting the ultrasonic pulse. The urethane is available in a range of stiffness from very soft to very firm; the choice is dictated by the application.

The system is operated through a computer keyboard or a mouse. Before operation, a "zeroing" procedure is performed so that the change in the thickness of the elastomer sheet can be calculated when the sensor contacts an object. The sensor is calibrated for force by entering the appropriate value for the stiffness of the elastomer sheet through the keyboard. To show force value, the numerical value of each tactile element (taxel) in the selected tactile image can be displayed.

Various methods and technologies have been used in the past to acquire normal tire footprint pressure distributions. They range from single sensors using microgaging wheatstone bridge technology to pressure sensitive resistors and films such as Fugi film.

Some piezoelectric materials can act as transducers. Piezoelectric transducers convert electrical signals to physical motion. Sensor material is usually a ceramic based on titanates of barium or lead zirconite. The rigidity of ceramics makes them suited for converting electrical energy to mechanical motion in applications such as speakers or signaling alarms but are brittle and cannot be made with large surface areas or in complex shapes. When acting as an ultrasonic receiver/transmitter, the PVDF film acts as a transducer.

Conversly, some piezoelectric materials are able to convert physical motion into an electrical voltage. As used in the present invention, the PVDF film converts pressure contact of the sensor into a measureable voltage.

SUMMARY OF THE INVENTION

Methods and apparatus for measuring shear forces and normal forces produced by an object are provided.

In one embodiment the method comprises the steps of a) disposing a layer of piezoelectric material on a substrate, the piezoelectric material having two conductive surfaces and shear orientation such that generated piezoelectric voltage is sensitized in a single axis of a shear plane and is capable of converting mechanical stresses into voltage changes, b) covering the piezoelectric material with an elastomeric pad, the piezoelectric material, the substrate, and the elastomer pad comprising the sensor, c) contacting the sensor with an object, d) measuring tension and compression by the generation of opposite polarity voltages, and e) quantifying the tension and compression using stress constants defining the relationship of mechanical stress and generated voltage. The method further comprises measuring normal forces by a) stimulating the piezoelectric material ultrasonically and measuring a responsive ultrasonic signal indicating the amount of compression of the pad, and b) quantifying the normal forces by measuring the TOF of the signal and taking into account the stiffness of the elastomeric layer according to the formula $$d_1 - d_2 = \tfrac{1}{2} c(t_1 - t_2) \tag{1}$$

$$F = k(d_1 - d_2) = \tfrac{1}{2} kc(t_1 - t2) \tag{2}$$

where:

d1 = the original thickness of the pad over the element
d2 = the thickness of the compressed pad
t1 = time-of-flight of ultrasound through the noncompressed rubber
t2 = time of flight of ultrasound through compressed rubber
F = compressing force
c = speed of sound in the elastomer, and
k = elastomer stiffness.

In the method, since piezoelectric voltages are generated by both normal forces and shear forces, the normal component of the piezoelectric voltage is subtracted from the total voltage generated in order to obtain the shear component.

In a further embodiment of the method, single sensors are disposed in a high density array and the array can be used for mapping the pressure points generated by an object. When an array is used, the vector components of shear are measured by disposing each sensor to have a different orientation from its adjacent sensor, so that each sensor measures a different vector of shear from its adjacent sensor.

In an alternative embodiment, at least two layers of piezoelectric film are provided in each sensor and each layer of film is oriented on a different axis so that normal forces and shear forces in multiple axes can be measured using a single sensor.

The apparatus of the invention comprises at least one sensor, and includes an ultrasonic pulsing source in proximity to the sensor, a means for measuring normal forces on the sensor using an ultrasonic echo, means for measuring normal forces and shear forces by measuring a piezo voltage generated by the sensor, and means for subtracting normal forces from the total forces to obtain a measure of pure shear forces.

In a further embodiment of the apparatus, single sensors have an axis of orientation and are disposed in a high density array wherein each sensor is disposed having a different orientation from its adjacent sensor so that different axes of shear are measured by different sensors.

In an alternative embodiment, the sensor may comprise at least two layers of piezoelectric material where each layer of material has a different axis of orientation, and each sensor is capable of measuring normal forces, and shear forces on an "x" axis and a "y" axis.

DETAILED DESCRIPTION OF THE INVENTION

Figure 1:
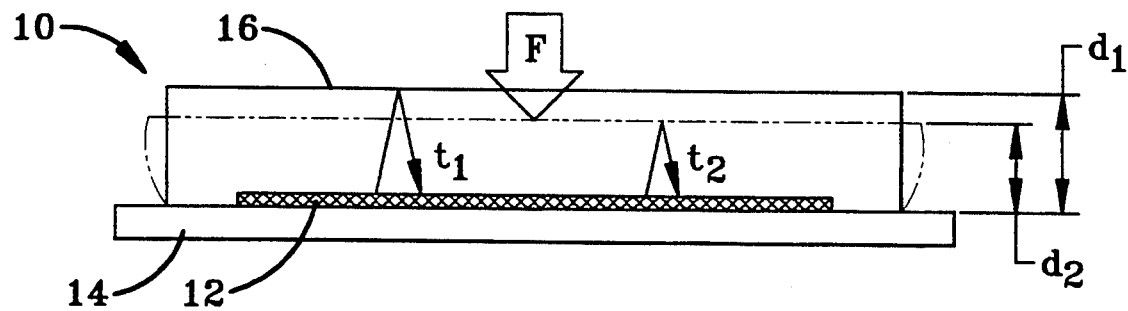
FIG. 1 illustrates a side view of a prior art sensor used in an apparatus of the invention.

The apparatus of the present invention incorporates modified versions of a sensor developed by Bonneville Scientific with initial funding by NASA, the Department of Energy, and the National Science Foundation. In 1991, the Veterans Administration sponsored research into using the technology in a foot pressure monitoring system to locate pressure points in the feet of diabetic patients.

A PVDF (polyvinylidine) film acquires piezoelectric properties when a large electrostatic force is applied in the thickness plane as the film is stretched. The film used in the present invention is manufactured by Pennwalt Corp. with a conductive surface on both sides to accommodate this process. It comes in various thickness's depending on the application and the response desired.

The PVDF film material can be used as a sensor material to measure shear and normal forces produced by an object. In the illustrated embodiment, the object is an elastomeric material, and specifically, the material is used to measure the forces generated in a tire footprint.

Large thin sheets of the material can be cut into nearly any shape. The film is sensitive to mechanical stress, withstands high voltages, operates over a broad frequency range, and responds to a wide degree of mechanical stress. The film generates a proportional voltage when compressed or stretched. Stress constants define the relationship between applied mechanical stress and generated voltage. Tension and compression are sensed by the generation of opposite polarity voltages.

The stress constants are specific for the materials used and are determined by methods known to those skilled in the piezoelectric film art. Piezoelectric strain constants define the mechanical strain induced in the film by an applied voltage, and stress constants define the voltage generated by the film when subjected to mechanical stress. Since piezoelectric film used herein is anisotropic, a given voltage across the film produces differing mechanical strains in each of the major axes. Likewise, the voltage produced by a given stress depends on the axis in which the stress is applied. Accordingly, a different piezoelectric constant applies for each axis.

When a piezoelectic film is used as a sensor in a measuring device of the invention, the various constants are automatically included in the overall determination in the "zeroing" of the apparatus. Thus, when the machine is zeroed when there is no pressure on a piezo sensor, and a high range value is set when a known pressure is placed on a sensor, the constants are automatically included in the determination of the various values across the range of values between zero and the high range value.

The sensor of the invention combines two properties of the PVDF material to sense the normal and shear forces of a single point. To sense normal forces, the material is used as an ultrasonic transmitter and receiver, and shear forces are sensed by the generation of piezo voltages. Piezo voltage is generated by both normal and shear forces, and in order to isolate the shear forces, it is necessary to subtract the normal force voltage from the total piezo voltage generated. This is done by combining the ultrasonic output with the piezo output such that the normal output is canceled when sensing a shear force. The resultant piezo output then becomes pure shear force. The shear vector is then resolved by the polarity of the voltage generated.

With reference now to FIG. 1, the sensor portion 10 of the apparatus 20 comprises a small surface of PVDF film 12 mounted on a substrate 14 (the substrate is ceramic in the illustrated embodiment). An elastomer pad 16 is placed on top of the film 12. The PVDF film acts as both an ultrasonic transmitter and receiver to measure the thickness of the overlying elastomer pad which is compressed when a normal force is applied. In response to an ultrasonic stimulation by an ultrasound transmitter, the PVDF film transmits an ultrasonic pulse which travels through the elastomer pad, is reflected off the top of the surface of the elastomer (an ultrasonic echo), and returns to the source. The time interval (t1) for this travel, or Time Of Flight (TOF), is measured. When a normal force is applied to the elastomer pad, the pad is compressed and the TOF is reduced (t2). The difference in the TOF is proportional to the compression of the pad, which, in turn is proportional to the applied force and the stiffness of the elastomer pad.

The relationship can be described by the formula $$d_1 - d_2 = \tfrac{1}{2} c(t_1 - t_2) \tag{1}$$

$$F = k(d_1 - d_2) = \tfrac{1}{2} kc(t_1 - t_2) \tag{2}$$

where:
$d_1$ = the original thickness of the pad over the element
$d_2$ = the thickness of the compressed pad
$t_1$ = time-of-flight of ultrasound through the noncompressed elastomer
$t_2$ = time of flight of ultrasound through compressed elastomer
F = compressing force
c = speed of sound in the elastomer, and
k = elastomer stiffness.

Figure 2:
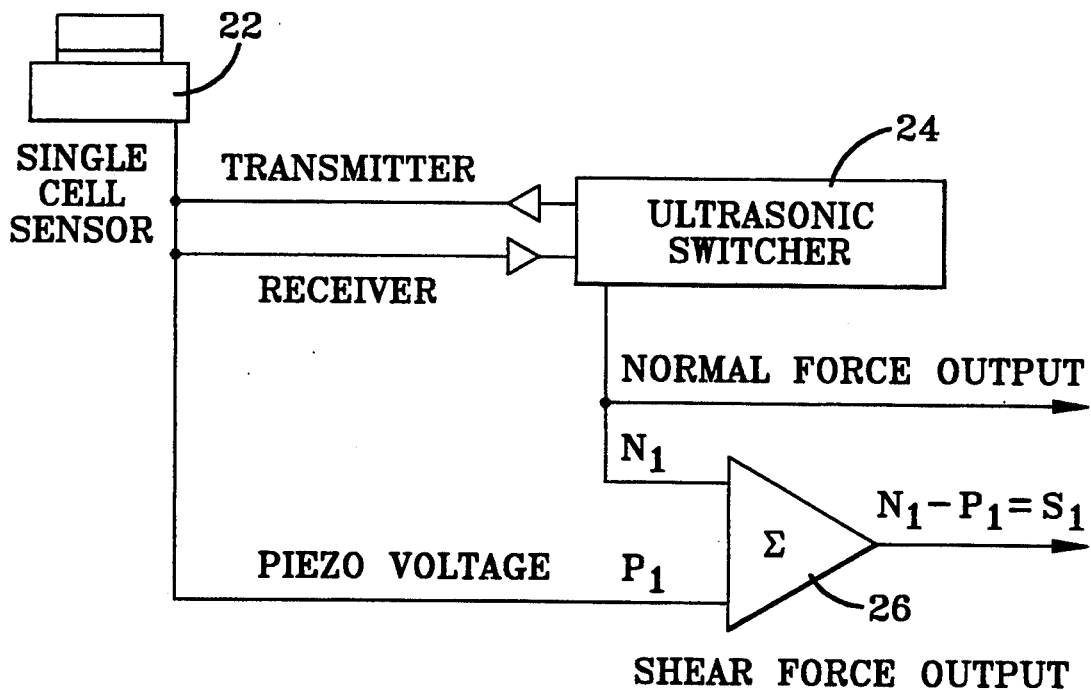
FIG. 2 represents a block diagram illustrating the main components of an apparatus.

FIG. 2 is a simplified block diagram of the measurement system. Each sensor 22 in an array of sensors 20 (see FIG. 3) is stimulated ultrasonically by ultrasonic switcher 24 and the ultrasonic echo produced is detected by the ultrasonic switcher 24 to provide the normal force output P1. The second output from the PVDF film is the generation of a piezoelectric voltage as the film is subjected to shear forces. The film will generate a piezo voltage as the result of both normal and side forces. The side force component is isolated by combining the output of the ultrasonic output with the piezo output to cancel out the normal component of the piezo signal. Device 26 comprises a summing amplifier which can be used, using multipliers predetermined by calibration, to subtract voltage corresponding to normal forces measured by the ultrasonic part of the apparatus, from total piezoelectric voltage output generated, to provide a voltage that corresponds to the shear forces created by an object contacting the sensor. In an alternative embodiment, software designed to subtract the normal forces (obtained ultrasonically), from the forces indicated by the piezo electric output, can be used to provide a measurement of the shear forces. Thus, both normal and lateral forces are detected and measured.

Figure 3:
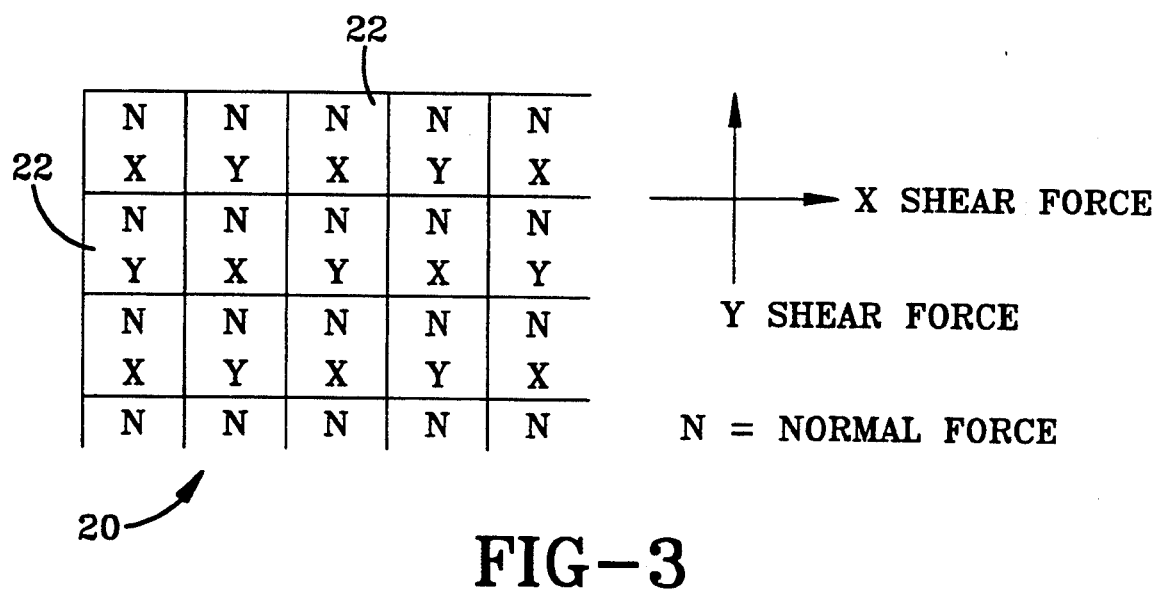
FIG. 3 illustrates orientation of individual sensors in a matrix of sensors.

It is noted that the PVDF film has a shear orientation When manufactured, i.e., the piezo voltage generated is sensitized to a single axis of the shear plane. To get the second axis, one need only alter the orientation of adjacent sensors. With reference now to FIG. 3, the individual sensors 22 in array 20 are placed in the array so that the x axis of the shear force is measured by one sensor, and the y axis of the shear force is measured by its adjacent sensor. This makes it possible, because of the axis sensitive nature of the piezo electric material, to measure each vector component of the shear force. The discreet sensors can be made as small as 0.06 by 0.06 inch and retain all the properties described in this specification. It is believe that sensors 0.06 to 0.30 inch wide by 0.06 to 0.30 inch long will provide useful results in the invention.

Figure 4:
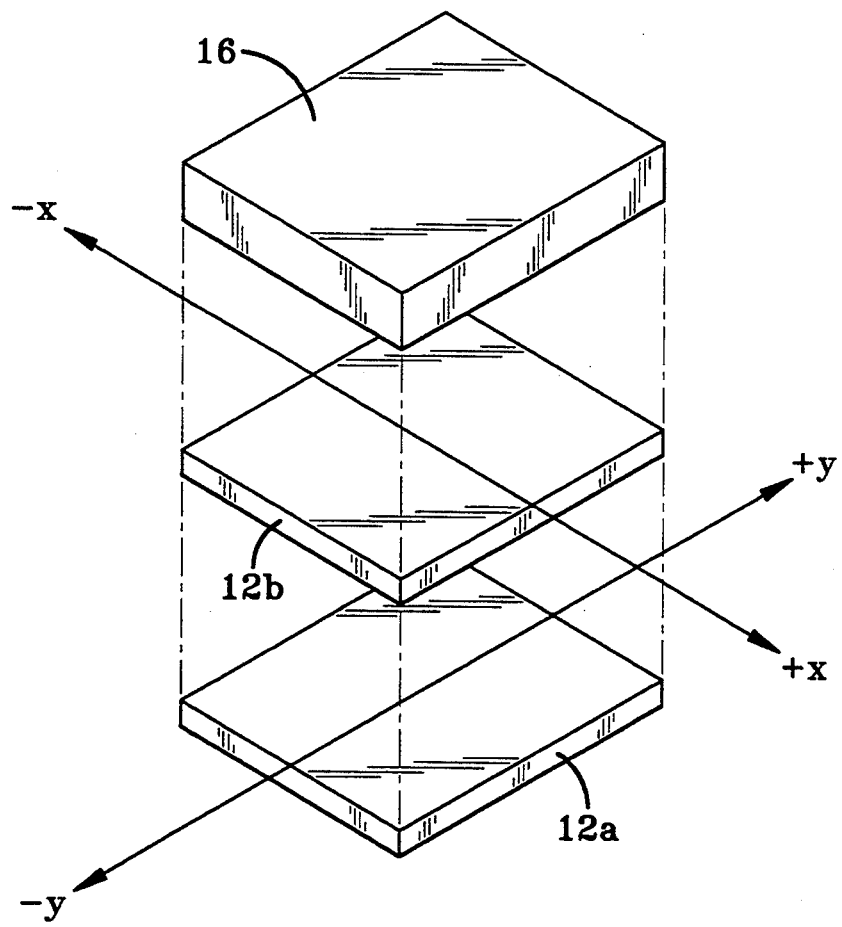
FIG. 4 illustrates a sensor comprising two layers of PVDF film.

With reference now to FIG. 4, in an alternative embodiment of the apparatus, the sensor may comprise at least two layers of piezoelectric material 12a, 12b, one above the other. In the illustrated embodiment, the piezo layers 12a and 12b are disposed in the sensor each having a different orientation from the other. For example, piezo layer 12b has an axis of orientation along the "X" axis, and piezo layer 12a has an angle of orientation along the "Y" axis. Since the piezo layers are sensitive along one axis only, layer 12b provides a measure of shear forces along the "X" axis and piezo layer 12a provides a measure of shear forces along a "Y" axis. Accordingly, sensor arrangement 30 provides, including a measurement of normal forces, pressure measurements on three axes in one sensor.

In the illustrated embodiment, the "X" axis and "Y" axis are oriented 90° relative to one another, but those skilled in the art will recognize that other orientations eg. 30° or 45°, may be suitable for particular applications. Also, although piezo layer 12b is illustrated as being stacked on top of piezo layer 12a in FIG. 4, those skilled in the art will recognize that layers of other kinds of materials may be placed between or on top of the piezo layers.

Figure 5:
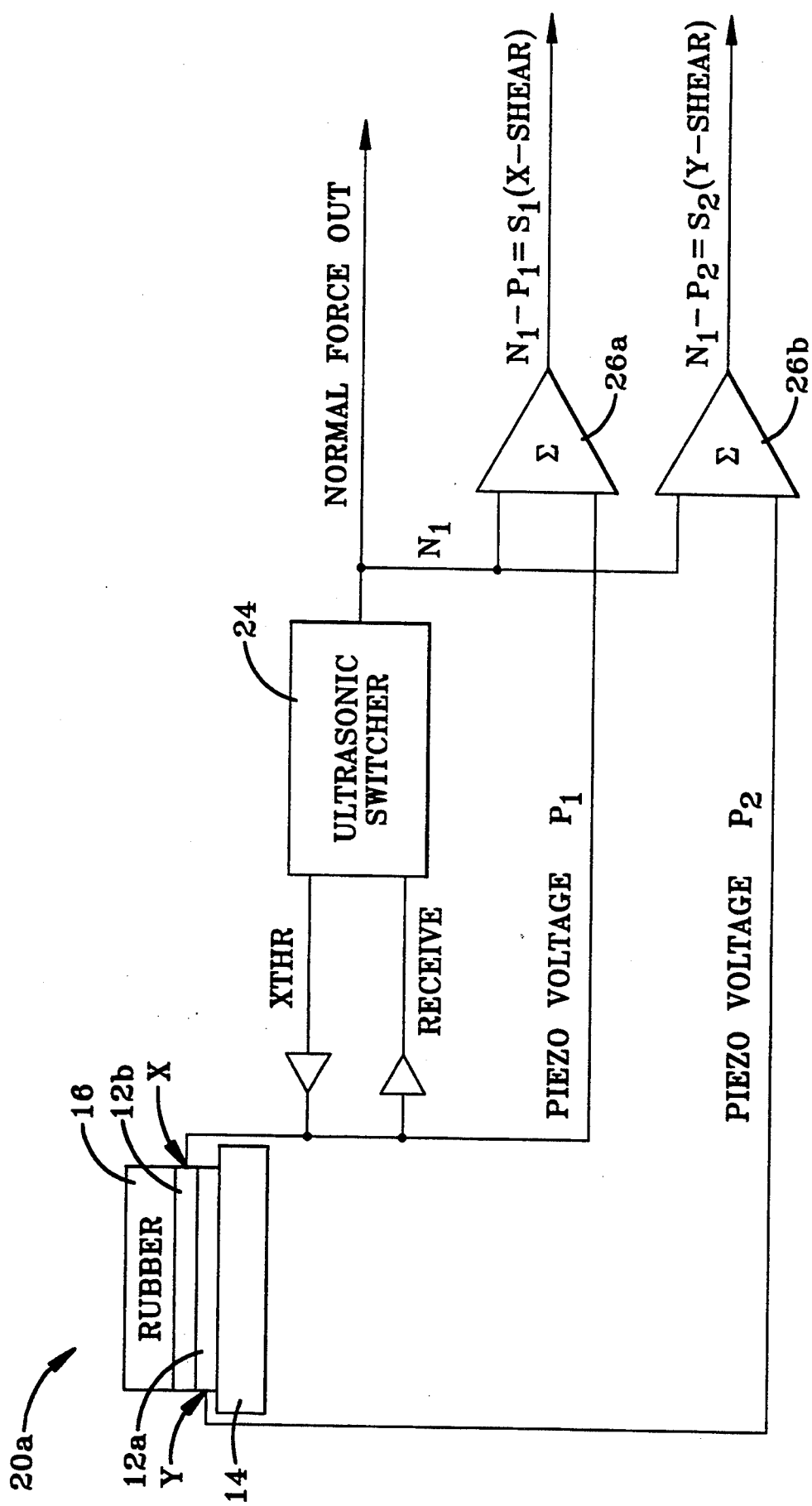
FIG. 5 illustrates a block diagram incorporating a sensor having two differently oriented layers of film.

With reference now to FIG. 5, when the sensor configuration of FIG. 4 is incorporated in the apparatus of the invention (c.f. FIG. 2), additional circuitry is needed to register the "X" axis shear ($P_1$) and the "Y" axis shear ($P_2$), and additional hardware 26a, 26b is needed separate the normal components of the pressure from the shear components. The apparatus will otherwise function as described above.

Although it is believed that the sensor of the present invention can be used in many applications, the sensor, for the inventor, has particular advantages in measuring pressures generated in the footprint of a tire.

Determination of tire footprint pressures are useful in predicting how a tire tread will wear, and possibly how a tire will hold the road. Shear pressure produced by individual lugs, or by portions of the tire tread, may provide an indication of possible irregular wear. Normal tire footprint pressures are currently being evaluated by the Goodyear Tire & Rubber Company using a Teckscan ® device. Determination of shear pressures are determined by a painstaking point by point analysis. Using the present invention, a complete tire footprint can be mapped and the results graphically displayed, showing normal and shear pressures, in one operation.

The invention is further illustrated with reference to the following example.

EXAMPLE

Figure 6:
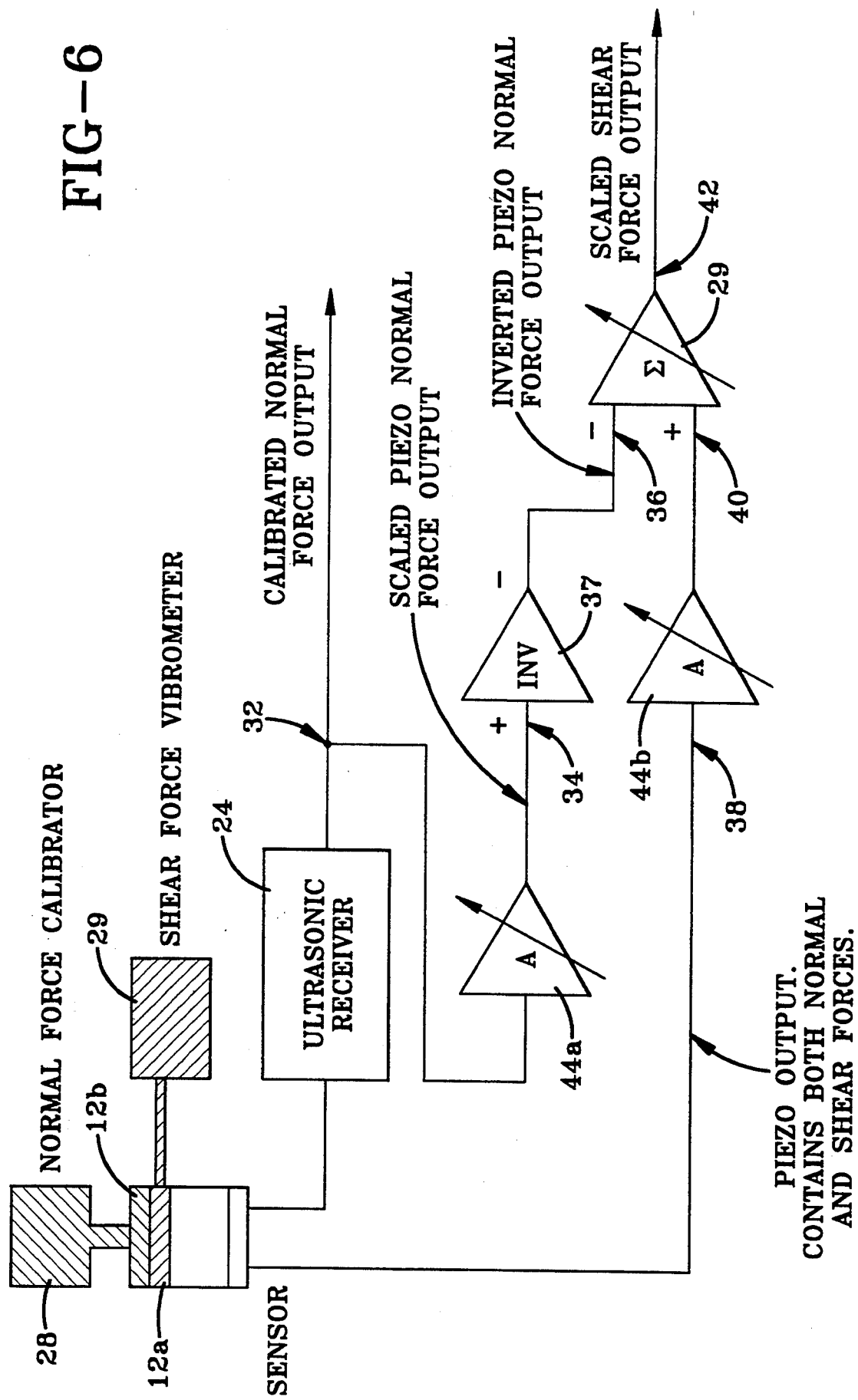
FIG. 6 illustrates apparatus used to calibrate the apparatus of the invention.

In order to illustrate how an apparatus of the invention may be calibrated, reference is now made to FIG. 6, which illustrates the apparatus of FIG. 2 together with a normal force calibrator 28 and a shear force vibrometer 29.

The calibration procedure is predicated on the assumption that the ultrasonic outputs and piezo outputs have an acceptable linear response. If the response is nonlinear the same procedure would apply, but customized calibration tables would have to be generated.

In the procedure, a series of normal forces are applied to the sensor and the ultrasonic output is scaled at junction point 32 to the desired scale factors. This can be done through the generation of an analog voltage or the generation of digitized values representative of the applied force.

In the calibration of the piezo normal force, a dynamic normal force of 0.5 hertz or higher is applied to the sensor. This can be done with calibrated vibrometer 29. Scale amplifiers 44a and 44b generate a calibrated voltage at points 40 and 36, respectively. Amplifier 44a is calibrated to provide an equal but opposite voltage (note inverter 37) at point 36 as compared to point 40.

In the calibration of the piezo shear force, a static maximum range normal force is applied to the sensor and then a dynamic shear force of 0.5 hertz or higher is applied to the axis of orientation using a shear force generator. The shear force generator has an in line bi-directional load cell which records the applied forces. The amplifier 29 is set to the desired scale factor based on vibrometer calibration values.

The output at point 42 corresponds to the shear force on the calibrated axis since the normal forces generated by the piezo output are cancelled by the calibrated inverse voltage generated by the ultrasonic output.

The present invention provides a high resolution matrix of measurements for a tire footprint that were previously unattainable except through a laborious single point process using a triaxial force pin transducer. Since it acquires the data in one operation there is perfect registration whereas the triaxial force pin method requires numerous repetitions and the reconstruction of the data, and the accuracy of the prior art method is further compromised by the need to manually position the transducer for each point on the footprint.

While specific embodiments of the invention have been illustrated and described, those skilled in the art will recognize that the invention may be variously modified and practiced without departing from the spirit of the invention. The invention is limited only by the following claims.

What is claimed is:

1. A method of measuring shear forces and normal forces produced by an elastomeric object using a single sensor comprising the steps of
    a) disposing at least one layer of piezoelectric material having two conductive surfaces and shear orientation such that generated piezoelectric voltage is sensitized in a single axis of a shear plane and converts mechanical stresses into voltage changes on a substrate material;
    b) covering said piezoelectric material with an elastomeric pad, said piezoelectric material, said substrate, and said elastomer pad comprising said sensor;
    c) contacting said sensor with an elastomeric object;
    d) stimulating said piezoelectric material ultrasonically and measuring a responsive ultrasonic signal indicating the amount of compression of said pad;
    e) measuring tension and compression by the generation of opposite polarity voltages;
    f) calculating normal forces by measuring the TOF of the signal and taking into account the stiffness of the elastomeric layer according to the formula $$d_1 - d_2 = \tfrac{1}{2}c(t_1 - t_2) \quad (1)$$

$$F = k(d_1 - d_2) = \tfrac{1}{2}kc(t_1 - t_2) \quad (2)$$

where:
    $d_1$ = the original thickness of the pad over the element
    $d_2$ = the thickness of the compressed pad
    $t_1$ = time-of-flight of ultrasound through the noncompressed rubber
    $t_2$ = time of flight of ultrasound through compressed rubber
    $F$ = compressing force
    $c$ = speed of sound in the elastomer, and
    $k$ = elastomer stiffness;
    g) measuring piezoelectric voltages generated by contact of the elastomeric article with the sensor;
    H) calculating shear forces by combining ultrasonic output with piezoelectric output such that the outputs cancel, thereby providing a pure measure of shear force; and
    i) resolving the shear vector by the polarity of the voltage generated.

2. A method of measuring shear forces and normal forces produced by an elastomeric object using a single sensor array comprising the steps of
    a) disposing a piezoelectric material having a conductive surface on both sides and an axis of orientation on a substrate material to provide a high density array of piezoelectric material;
    b) covering said array with an elastomeric pad, said piezoelectric material, said substrate and said pad comprising said sensor array;
    c) contacting said sensor array with an elastomeric object;
    d) measuring tension and compression by the generation of opposite polarity voltages;
    e) calculating the tension and compression using stress constants defining the relationship of mechanical stress and generated voltage;
    f) stimulating said piezoelectric material ultrasonically and measuring a responsive ultrasonic signal indicating the amount of compression of the pad; and
    g) calculating said normal forces by the measuring the TOF of the signal and taking into account the stiffness of the elastomeric layer according to the formula $$d_1 - d_2 = \tfrac{1}{2}c(t_1 - t_2) \quad (1)$$

$$F = k(d_1 - d_2) = \tfrac{1}{2}kd(t_1 - t_2) \quad (2)$$

where:
    $d_1$ = the original thickness of the pad over the element
    $d_2$ = the thickness of the compressed pad
    $t_1$ = time-of-flight of ultrasound through he noncompressed rubber
    $t_2$ = time of flight of ultrasound through compressed rubber
    $F$ = compressing force
    $c$ = speed of sound in the elastomer, and
    $k$ = elastomer stiffness;
    h) measuring piezoelectric voltages generated by contact of the elastomeric article with the sensor array;
    i) measuring shear forces by combining ultrasonic output with piezoelectric output such that the outputs cancel thereby providing a pure measure of shear force; and i) resolving the shear vector by the polarity of the voltage generated.

3. A method of measuring shear forces and normal forces produced by an elastomeric object using a single sensor array comprising the steps of
   a) disposing two layers of a piezoelectric material having a conductive surface on both sides and an axis of orientation on a substrate material such that each layer of the piezoelectric material has a different axis of orientation to provide a high density array of stacked piezoelectric material;
   b) covering said array with an elastomeric pad, said piezoelectric material, said substrate and said pad comprising said sensory array;
   c) contacting said sensor array with an elastomeric object;
   d) measuring tension and compression by the generation of opposite polarity voltages;
   e) calculating the tension and compression using stress constants defining the relationship of mechanical stress and generated voltage;
   f) stimulating said piezoelectric material ultrasonically and measuring a responsive ultrasonic signal indicating the amount of compression of the pad;
   g) calculating said normal forces by the measuring the TOF of the signal and taking into account the stiffness of the elastomeric layer according to the formula $$d_1 - d_2 \tfrac{1}{2} c(t_1 - t_2) \qquad (1)$$

$$F = k(d_1 - d_2) = \tfrac{1}{2} k c(t_1 - t_2) \qquad (2)$$

where:
   $d_1$ = the original thickness of the pad over the element
   $d_2$ = the thickness of the compressed pad
   $t_1$ = time-of-flight of ultrasound through the noncompressed rubber
   $t_2$ = time of flight of ultrasound through compressed rubber
   F = compressing force
   c = speed of sound in the elastomer, and
   k = elastomer stiffness;
   h) measuring piezoelectric voltages generated by contact of the elastomeric article with the sensor array;
   i) calculating shear forces by combining ultrasonic output with piezoelectric output such that the outputs cancel thereby providing a pure measure of shear force;
   j) resolving the shear vector of both axes by the polarity of the voltage generated; and
   k) orientating each sensor in said matrix to have a different orientation from an adjacent sensor to provide multiple axes of orientation for shear forces.

4. The method of claim 3 which comprises the further step of making each sensor in said matrix to have a width of 0.06 to 0.30 inch and a length of 0.06 to 0.03 inch.

5. An apparatus for measuring shear forces and normal forces of an elastomeric object comprising
   a) at least one sensor comprising a piezoelectric material, having conductive surfaces on both sides thereof and an axis of orientation, and generating an electrical voltage in response to pressure contact;
   b) an ultrasonic pulsing source in proximity to said at least one sensor scuh that said pulsing source is capable of stimulating an ultrasonic echo in said sensor;
   c) means for measuring normal forces on said sensor using an ultrasonic echo;
   d) means for measuring shear forces and normal forces on said sensor by measuring a voltage generated by said sensor; and
   e) means for subtracting normal forces measured by ultrasonic means from total forces measured by said generated voltage to provide a measure of pure shear forces.

6. The apparatus of claim 5 which comprises a high density array of sensors wherein each said sensor has a shear orientation such that generated piezoelectric voltage is sensitized to a single axis in a shear plane, each said sensor being oriented differently from an adjacent sensor to provide measurements on multiple shear axes, and each said sensor comprising two layers of piezoelectric material, one layer above the other, wherein each layer of piezoelectric material has a different axis of orientation.

7. The apparatus of claim 6 in which each sensor is 0.06 to 0.30 inches wide and 0.06 to 0.30 inches long.

8. The apparatus of claim 6 in which said sensor matrix is covered by a rubber layer which provides a contact surface for an elastomeric object on which shear forces and normal forces are measured.

9. A method of measuring shear forces and normal forces in a tire footprint comprising the steps of:
   (a) providing a sensor comprising a layer of piezoelectric material having two conductive surfaces and shear orientation and converts mechanical stresses into voltage changes to provide a measure of shear forces created by said tire footprint;
   (b) using ultrasonic measuring means with said sensor for measuring normal forces of said tire footprint;
   (c) rolling a tire over said sensor;
   (d) measuring tension and compression created by said rolling tire using stress constants defining the relationship of mechanical stresses and generated voltage to measure said shear forces; and
   (e) mapping the results showing normal and shear pressures in a point by point analysis on a complete footprint in one operation.

* * * * *